Dec. 30, 1947.  H. G. HUGHEY  2,433,514
STARTING ROD FEED DEVICE
Filed Jan. 14, 1944
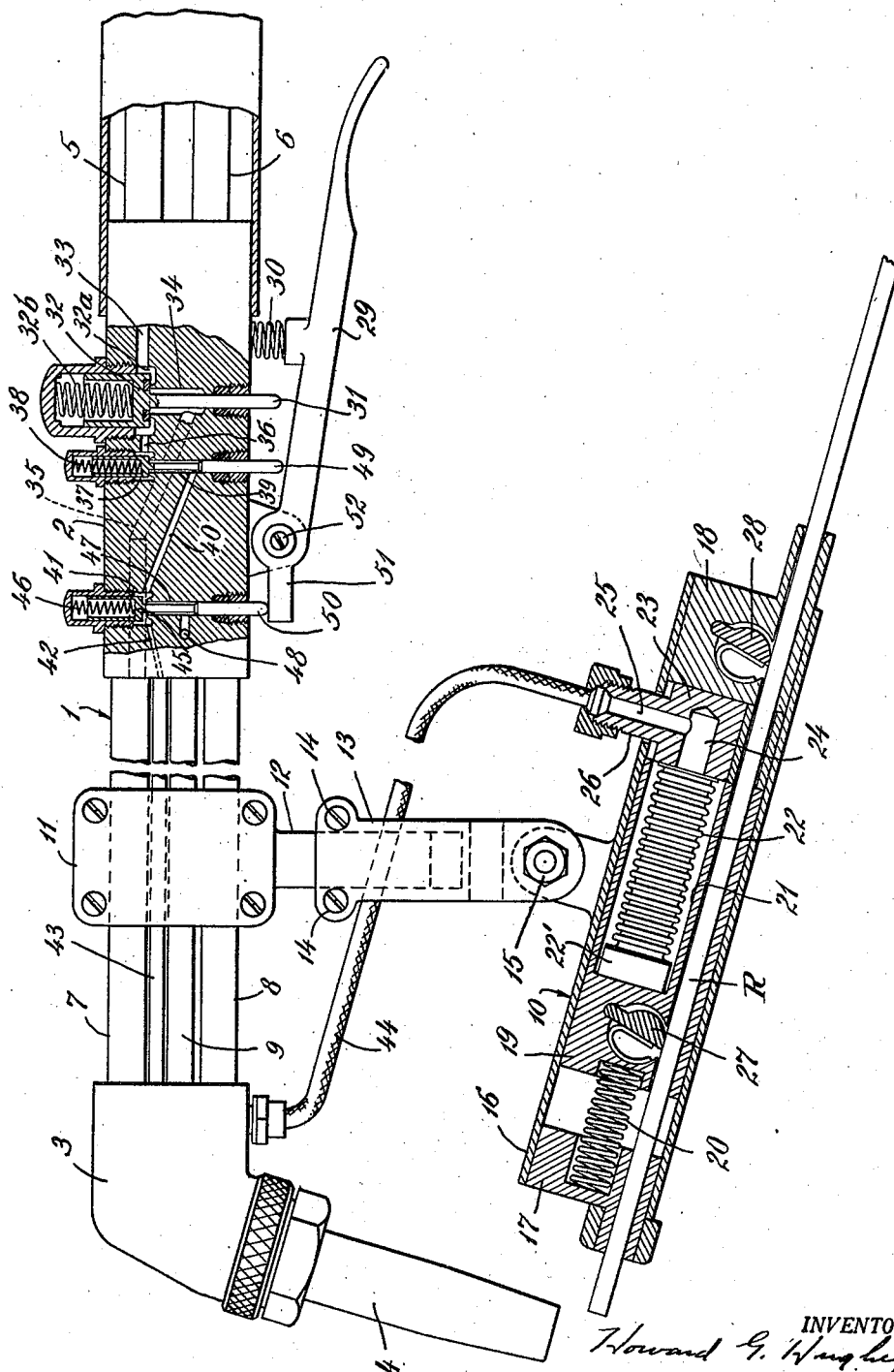
INVENTOR.
Howard G. Hughey
BY
Pennie, Davis, Marvin & Edmonds
ATTORNEYS

UNITED STATES PATENT OFFICE 2,433,514

STARTING ROD FEED DEVICE

Howard G. Hughey, Fanwood, N. J., assignor to Air Reduction Company, Incorporated, a corporation of New York Application January 14, 1944, Serial No. 518,282

6 Claims. (Cl. 110—22)

This invention relates to starting rod feed devices such as used with oxygen cutting torches to feed a starting rod or wire into the flame jets of the torch to effect quicker starting when cutting steel, or when de-seaming, billet gouging, scarfing, flame-machining, or performing similar operations.

Starting rod feed devices for oxygen torches have already been proposed in which the rod feed device, clamped to the torch, is actuated mechanically by linkage connected to the handle or lever that actuates the cutting-oxygen valve so that when such handle is depressed the rod feed device is first operated to feed the starting rod forwardly and thereafter the cutting oxygen valve is opened. However, starting rod feed devices of this type have certain disadvantages. For instance, actuation of the rod feed device mechanically from the cutting oxygen lever considerably increases the effort required on the part of the operator to depress this lever. Moreover, such a rod feed device when designed for one type of torch is not always adapted for use on a different type of torch or one of different length and therefore torches of various kinds require rod feed devices of special design. Furthermore, a torch having a rod feed device actuated mechanically from the cutting oxygen lever by linkage is likely to have too much overhanging weight.

The principal object of this invention is to provide a starting rod feed device which is free of the above-mentioned disadvantages of prior types and which has certain advantages not possessed by them.

According to the invention mechanical linkage between the cutting oxygen lever and the rod feed device is eliminated by utilizing fluid pressure as the motivating force for the rod feed device and controlling the supply of motive fluid to and its exhaust from the rod feed device by one or more valves preferably controlled by manipulation of the cutting oxygen lever. The motive fluid is preferably oxygen tapped from the supply of oxygen passing to or through the torch, and the valves which control its delivery to the rod feed device and its exhaust therefrom are preferably, though not necessarily, incorporated in the torch itself, the passage of oxygen to and from the rod feed device being through a flexible conduit connecting the rod feed device with the torch.

The accompanying drawing illustrates in side elevation, with certain parts shown in longitudinal section, a portion of an oxygen torch and starting rod feed device embodying the invention.

The drawing shows a gas torch 1 having a valve block 2, a head 3, and a tip 4. Oxygen is supplied to the valve block 2 through a tube 5, and fuel gas, such as acetylene, is supplied to it through a second tube 6. The cutting oxygen passes from the valve block 2 to the head 3 through a tube 7, and the acetylene through a tube 8. Oxygen for the preheating jets passes from the valve block 2 to the head 3 through an additional tube 9 and may be mixed with the acetylene in the tip 4 to form the combustible mixture for the preheating jets in a manner well understood in the art. The cutting oxygen issues in the usual way from a central orifice (not shown) in the tip 4 and the preheating jets may issue from orifices (not shown) surrounding it.

The rod-carrying assembly 10 forming a part of the starting rod feed mechanism may be supported from the torch in any suitable way, for instance, as shown in the patent to Walker No. 2,158,489, by a bracket 11 clamped to the tubing of the torch and having a stem 12 extending into the upper portion of a clamp 13. Screws 14 draw the upper ends of the clamp 13 together and cause them to grip the stem 12. The clamp 13 may be adjusted up and down on the stem 12 and this adjustment combined with an angular adjustment of the feed device which can be made at the bolt 15 where the feed device is supported on the clamp 13, makes it possible to adjust the starting rod feed device to the correct position in which the starting rod will be properly fed into the region of the heating jets.

The rod feed device itself comprises a suitable tube or casing 16 having end guides 17 and 18 for the starting rod indicated at R. Within the tube 16 there is a slidable block or rod carrier 19 which is normally and yieldingly held in a rearward position by means of a coil spring 20 interposed between the end guide 17 and the slidable block 19. The rear end portion of the slidable block 19 has a cavity 21 adapted to receive a bellows 22 which reacts at its rear end against a stationary block 23 within the tube or casing 16. The forward end of the bellows is closed by a plate 22' which abuts against the forward end wall of the cavity 21. The block 23 has a passage 24 communicating with the interior of the bellows and this passage communicates with a supply passage 25 in a nipple portion 26 provided on the block 23 and which extends outwardly through the tube or casing 16. As shown in the drawing the starting rod passes through openings in the slidable block 19 and stationary block 23 which are aligned with the openings for the starting rod in the end guide blocks 17 and 18.

When motive fluid is admitted to the rod feed device through passage 25, the bellows 22 expands and the slidable block 19 is caused to move forwardly against the action of the spring 20. In so doing a pawl 27 mounted in the slidable block or rod carrier 19 grips the starting rod R and causes it to feed forwardly with the rod carrier. A second pawl 28 in the rear guide block 18 permits this forward movement of the starting rod R, but when the motive fluid is exhausted from the bellows 22 the spring 20 returns the rod carrier to its rearward position at which time the pawl 28 grips the starting rod and prevents it from returning with the rod carrier while the pawl 27 releases its grip on the starting rod and moves rearwardly with the rod carrier.

As above stated the motive fluid which is supplied to and exhausted from the bellows 22 to actuate the rod feed device may be oxygen and is preferably tapped from the supply of oxygen passing through the torch and it is preferably controlled by valves built in the torch although such valves could, if desired, be associated with an attachment for the torch. The torch shown in the drawing has the built-in arrangement of valves and they are actuated by the cutting oxygen handle or lever shown at 29. When this lever is depressed far enough against the action of a return spring 30 it engages a rod 31 connected to the cutting oxygen valve 32. When this valve is open cutting oxygen passes from a passage 33 in the valve block through a vertical bore 34, through another passage 35 in the valve block, through the above-mentioned tube 7 to the head 3, and thence to the cutting oxygen passage in the tip 4. Oxygen for actuating the starting rod feed device may be tapped from the cutting oxygen supply by a passage 36 communicating with the valve chamber 32a in which the cutting oxygen valve 32 is located. A valve 37, normally seated by a coil spring 38, controls communication between the passage 36 and a vertical bore 39. When the valve 37 is open oxygen passes from the passage 36 to the vertical bore 39 then through a passage 40 in the valve block, through the valve chamber 41 of an exhaust valve, to be later described, through passage 42 in the valve block, and through a special tube 43 to the head 3 of the torch. By means of suitable passages (not shown) within the head, the tube 43 communicates with a flexible tube or hose 44 leading to the supply passage 25 in the nipple 26 of the starting rod feed device. An exhaust valve 45 in the valve block, normally seated by a coil spring 46, controls communication between the passage 42 and a vertical bore 47, which latter communicates with a vent passage 48 leading to the atmosphere.

The valve 37 for controlling the supply of oxygen to the rod feed device and the valve 45 for controlling the exhaust of oxygen from it, are connected to rods 49 and 50, respectively, which slide in valve block 2 and project from it so that they can be actuated by the cutting oxygen lever 29. The cutting oxygen lever is provided with an extension 51 in advance of the lever-pivot 52 and this extension is adapted to actuate the rod 50 of the exhaust valve 45. The arrangement of the rods on the three valves is such that when the cutting oxygen lever is depressed the extension 51 thereon moves away from the rod 50 and allows the exhaust valve 45 to close. Further movement of the cutting oxygen lever actuates the rod 49 of the valve 37 to open this valve and supply oxygen to the starting rod feed device from passage 36 through passages 39, 40, 42, tube 43, head 3 and hose 44. The bellows 22 will thereupon expand and feed the starting rod forwardly as above described. Still further movement of the cutting oxygen lever actuates the rod 31 of the cutting oxygen valve 32 and turns on the supply of cutting oxygen to the tip. When the cutting oxygen lever is released the valves operate in reverse sequence. The cutting oxygen valve 32 is first closed by its spring 32b, then the valve 37 closes to cut off the supply of oxygen to the rod feed device, and finally the extension 51 moves into engagement with the rod 50 and opens the exhaust valve 45. The bellows 22 is then placed in communication with the atmosphere and the oxygen is permitted to escape from the bellows through passages 24, 25, hose 44, head 3, tube 43, passage 42, vertical bore 47 and bent passage 48.

It will now be seen that a starting rod feed device actuated as herein disclosed is more flexible in its application to torches of different types and lengths than the type which is actuated mechanically by linkage from the cutting oxygen lever because the only connection between the torch and the rod feed device, other than the adjustable connections which support it from the torch, is the flexible hose 44. Elimination of the mechanical linkage between the cutting oxygen lever and the rod feed device lessens the overhanging weight and the device may be operated with practically no additional effort on the part of the operator as very little additional force is required to actuate the special valves for the rod feed devices over and above that which is normally required to actuate the cutting oxygen valve. The device may be so designed that only a small quantity of oxygen need be utilized to operate it through many cycles.

Obviously the bellows 22 could be replaced by a piston working in a cylinder, or a diaphragm, or any other equivalent mechanism which would effect reciprocation of the rod carrier in which the pawl 27 is located.

I claim:

1. The combination with a gas torch having a passage for the flow of gas to issue from the torch tip, of starting rod feed mechanism supported by the torch including a rod-carrying assembly, fluid-operated means carried by the starting-rod feed mechanism for advancing the starting rod, means placing said fluid-operated means in communication with said passage, said last-named means including a valve mechanism for controlling the supply of gas to and its exhaust from said fluid-operated means, and means to operate said valve mechanism.

2. The combination with an oxygen-cutting torch having passages for the flow of gases to issue from the torch tip, a valve for controlling the flow of gas through one of said passages and a handle for operating said valve, of starting-rod feed mechanism supported by the torch including a rod-carrying assembly, fluid-operated means carried by the starting rod feed mechanism for advancing the starting rod, a conduit connecting one of said passages for gases with the fluid-operated means, and a valve actuatable by said handle for controlling the supply of motive fluid through said conduit to the fluid-operated means.

3. The combination with an oxygen-cutting torch having passages for the flow of gases to issue from the torch tip, a valve for controlling the flow of gas through one of said passages and a handle for operating said valve, of starting-rod feed mechanism supported by the torch including a rod-carrying assembly, fluid-operated means carried by the starting rod feed mechanism for advancing the starting rod, a conduit connecting one of said passages for gases with the fluid-operated means, and a valve built into the torch actuatable by said handle for controlling the supply of motive fluid through said conduit to the fluid-operated means.

4. The combination with an oxygen-cutting torch having passages for the flow of gases to issue from the torch tip, a valve for controlling the flow of gas through one of said passages and a handle for operating said valve, of starting-rod feed mechanism supported by the torch including a rod-carrying assembly, fluid-operated means carried by the starting rod feed mechanism for advancing the starting rod, a conduit connecting one of said passages for gases with the fluid-operated means, and a supply valve and an exhaust valve each built into the torch and each actuatable by said handle for controlling the supply of motive fluid through said conduit to the operating means and its exhaust from the fluid-operated means.

5. The combination with an oxygen torch having a passage for cutting oxygen, a valve that controls the flow of cutting oxygen through said passage and a handle for operating the valve, of starting-rod feed mechanism supported by the torch including a rod-carrying assembly, fluid-operated means carried by the starting rod feed mechanism for advancing the starting rod, a conduit extending from the rod-carrying assembly to the torch and placing said cutting-oxygen passage in communication with said fluid-operated means, valve mechanism carried by the torch for controlling the flow of oxygen through said passage and conduit to the fluid-operated means and for controlling the exhaust of oxygen from the fluid-operated means, and means for actuating said valve mechanism by movement of said handle for the cutting-oxygen valve.

6. The combination with an oxygen torch having a passage therethrough for cutting oxygen, a valve that controls the flow of cutting oxygen through said passage and a handle for operating the valve, of starting rod feed mechanism supported by the torch including a rod-carrying assembly, fluid-operated means carried by the starting rod feed mechanism for advancing the starting rod, a conduit connecting said fluid-operated means with the cutting-oxygen passage in the torch, valve mechanism carried by the torch for controlling the supply of gas from said cutting-oxygen passage to and its exhaust from said fluid-operated means, and means so constructed and arranged that depression of said handle for the cutting oxygen valve first operates said valve mechanism and then opens the cutting oxygen valve.

HOWARD G. HUGHEY.

REFERENCES CITED

The following references are of record in the file of this patent:

UNITED STATES PATENTS

| Number | Name | Date |
|---|---|---|
| 1,431,916 | Anderson | Oct. 17, 1922 |
| 2,135,764 | Oleson | Nov. 8, 1938 |
| 2,288,027 | Scheller | June 30, 1942 |
| 2,309,096 | Bucknam et al. | Jan. 26, 1943 |
| 2,158,489 | Walker | May 16, 1939 |
| 2,291,065 | Walker | July 28, 1942 |
| 2,185,781 | Becker | Jan. 2, 1940 |
| Re. 16,307 | McCutcheon | Mar. 30, 1926 |
| 1,359,530 | Richardson | Nov. 23, 1920 |
| 1,928,425 | Hedde | Sept. 26, 1933 |
| 1,968,815 | Boyden | Aug. 7, 1934 |
| 2,181,082 | Hammon | Nov. 21, 1939 |
| 2,371,970 | Marra | Mar. 20, 1945 |
| 1,707,211 | Muscillo | Feb. 5, 1929 |

FOREIGN PATENTS

| Number | Country | Date |
|---|---|---|
| 381,145 | Great Britain | Sept. 29, 1932 |